July 7, 1936.  J. B. ARMITAGE  2,047,162
MACHINE TOOL TRANSMISSION AND CONTROL
Filed April 25, 1935  3 Sheets-Sheet 1
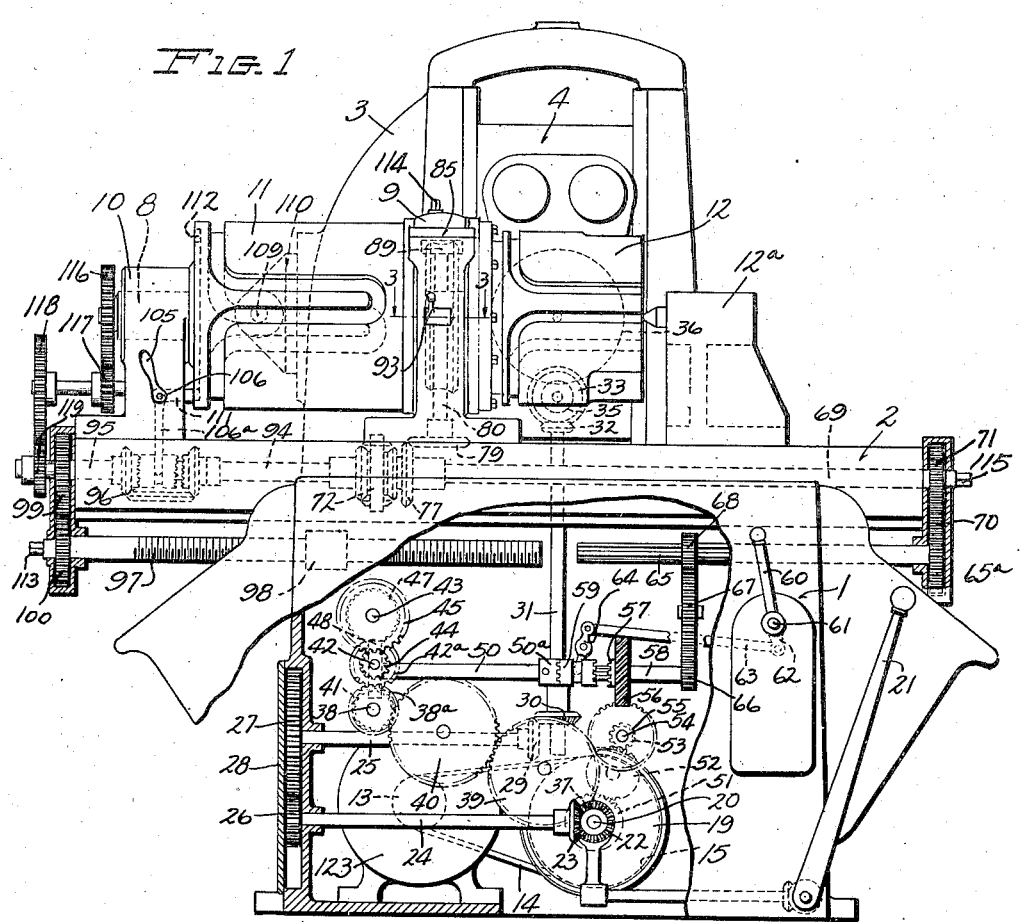
INVENTOR
JOSEPH B. ARMITAGE
BY
Fred G Parsons
ATTORNEY July 7, 1936.  J. B. ARMITAGE  2,047,162
MACHINE TOOL TRANSMISSION AND CONTROL
Filed April 25, 1935  3 Sheets-Sheet 2
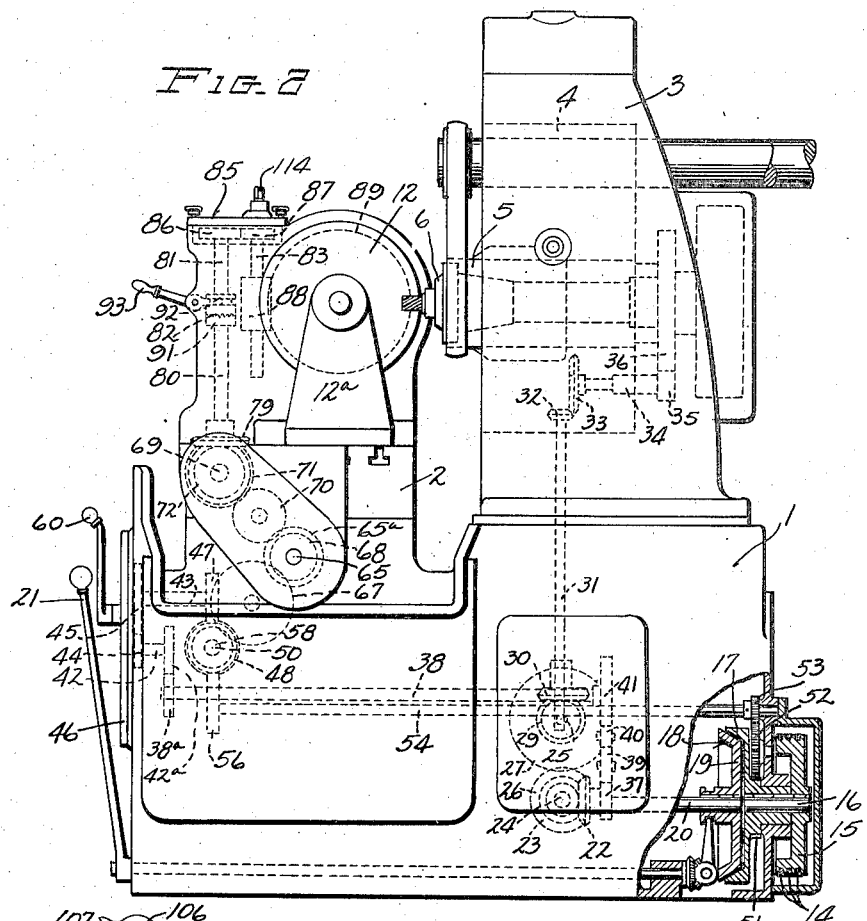
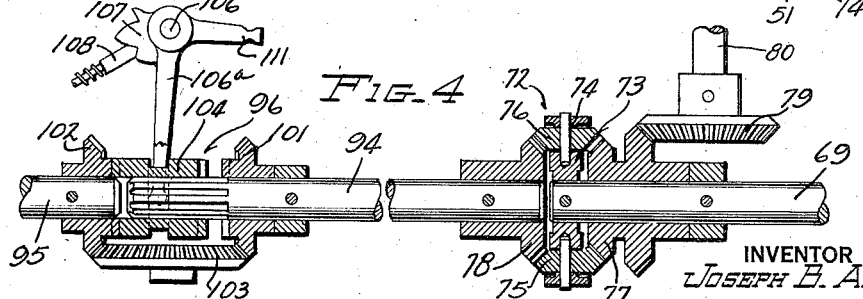
INVENTOR
JOSEPH B. ARMITAGE
BY
Fred G Parsons
ATTORNEY July 7, 1936. J. B. ARMITAGE 2,047,162
MACHINE TOOL TRANSMISSION AND CONTROL
Filed April 25, 1935  3 Sheets-Sheet 3

INVENTOR
Joseph B. Armitage.
BY Fred G. Parsons
ATTORNEY

Patented July 7, 1936

2,047,162

UNITED STATES PATENT OFFICE 2,047,162

MACHINE TOOL TRANSMISSION AND CONTROL

Joseph B. Armitage, Wauwatosa, Wis., assignor to Kearney & Trecker Corporation, West Allis, Wis., a corporation of Wisconsin Application April 25, 1935, Serial No. 18,114

29 Claims. (Cl. 90—13.4)

This invention relates to machine tools and more particularly to transmission and control mechanism therefor, and especially for milling machines.

A purpose of the invention is to provide an improved form of transmission and control for bodily relative movement of the work and cutter, either simultaneously or alternately in a plurality of mutually transverse directions or paths, as for instance longitudinal and cross movement, or rotary and axial movement.

A further purpose is to provide an improved transmission for simultaneously urging movement of a plurality of supports and in a form such that either support may be constrained to move relatively slower or faster, and more particularly to effect such a result by the means of a single mechanism simultaneously connected to the power source and to each of the supports, and especially for simultaneous rotary and axial movement.

A further purpose is to provide an improved transmission for driving a work piece in combined rotary and axial movements derived through a single device in such manner that a single power source may apply its power simultaneously to both movements but at predetermined relative rates according to the respective requirements.

A further purpose is to provide an improved transmission in a form such that the relative rate of movement in the one or the other of a plurality of directions may be varied during the cutting movement whereby more, or less, of the movement may be in the one or the other path, or if desired all the movement may be in either path.

A further purpose is to provide such improved transmission with control mechanism whereby repeated cycles of operation may produce exact duplicates of the machine movements for finishing duplicate work pieces one after another.

A further purpose is to provide an improved transmission and control in a form such that where the rate of movement in the one path is varied the rate is simultaneously varied in the other path, and if desired, in such proportion that the combined rates in the two paths provides a substantially constant rate of removal of metal from the work piece and also, if the cutter rotation is maintained constant, provides a substantially constant feed per cutter tooth per revolution of the cutter during the cutting operation.

A further purpose is to provide an improved transmission and control for cutting cams where the operation involves the use of a master cam, and of such form that master cams having very steep angles may be used, or even cams having grooved portions mutually at right angles.

A further purpose is generally to simplify and improve the construction and operation of machine tools and particularly milling machines having one or more of the improved features or constructions previously mentioned, and still other purposes will be apparent from the description of the machine herein disclosed, and from the claims.

The invention consists in the structure herein illustrated and described, and in such modifications of the structure described as are equivalent to the structure of the claims.

In the drawings like reference characters have been used to indicate the same parts in each of the views.

Fig. 1 is a front elevation of a milling machine embodying the invention, part of the base being broken away to show interior mechanism. A special master cam and work piece is included to illustrate one type of work for which the invention is adapted.

Fig. 2 is a right side elevation of the machine shown in Fig. 1, with a portion of the base broken away to show the drive pulley and clutch.

Fig. 3 is a partial section taken on the line 3—3 of Fig. 1.

Fig. 4 is an enlarged view of a portion of the transmission.

Figure 5:
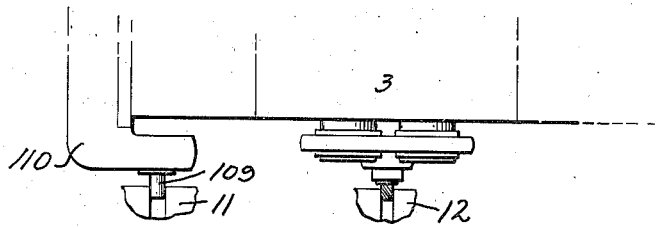
Fig. 5 is a top plan view of the cutter and master cam follower used when cutting certain types of cams.

The milling machine shown in the accompanying drawings, includes a hollow base or bed 1, a work support table 2 guided for horizontal reciprocation on the bed 1, a spindle support portion 3 fixed with the bed and uprising adjacent the table, a spindle carrier 4 guided for vertical adjustment, a spindle quill 5 guided in the carrier 4 for movement toward or from the table 2, and a cutter spindle 6 rotatably supported in the quill 5 in any suitable manner so as to prevent either axial or lateral displacement thereof with respect to the quill. Suitable adjusting and clamping means (not shown) are provided for the carrier 4 and the quill 5, as for instance, the means illustrated in United States Patent 1,967,733 issued July 24, 1934.

A rotatable work spindle 8, Figs. 1, 3, is carried by supports 9, 10, and carries a master cam 11 and a work piece 12. The work piece is centered and clamped for rotation with the master cam as shown in Fig. 2, and at its other end is provided with an additional support 12a, which is adjustably and removably fixed with the table to permit removal of the work piece.

A transmission is provided for the rotation of the cutter spindle 6, including a motor 123, a grooved pulley 13 keyed to the motor shaft, belts 14, a grooved pulley 15 fixed with a shaft 16 with which is also fixed one element 17 of a clutch 18, the other element 19 of which is slidably keyed on a shaft 20 and may be shifted by the means of a hand lever 21 connected for movement of element 19 in any suitable manner. A bevel gear 22 fixed on shaft 20 meshes with a bevel gear 23 fixed on one end of a shaft 24 which drives a shaft 25 through a rate changer which includes replaceable and reversably interchangeable gears 26, 27 retained under a removable cover plate 28.

A bevel gear 29 fixed on shaft 25 meshes with a bevel gear 30 slidably splined on a shaft 31 which is vertically movable with carrier 4. A second bevel gear 32, Fig. 2, on shaft 31 meshes with a bevel gear 33 fixed on one end of an extensible collapsible shaft 34, upon the other end of which is fixed a spur gear 35 in mesh with a spur gear 36 fixed on the cutter spindle 6.

A feed rate train is driven through clutch 18 and shaft 20 and includes a gear 37 fixed with the bevel gear 22, which drives a shaft 38 through gears 39, 40 and 41, the latter being fixed on the shaft 38, which drives a shaft 42 through gears 38a, 42a. Shaft 42 drives a shaft 43 through a feed rate changer which includes the removable and interchangeable gears 44, 45 retained under a suitable removable cover plate 46. A helical gear 47 fixed on the shaft 43 meshes with a helical gear 48 fixed on a shaft 50 upon which is also fixed a feed clutch element 50a.

A quick traverse rate train is driven to exclude the spindle clutch 18, and includes a gear 51 fixed with the clutch element 17, an idler 52, a gear 53 on a shaft 54, a helical gear 55 also fixed on shaft 54 and a helical gear 56 fixed with a quick traverse clutch element 57 and rotatably mounted coaxially with a shaft 58, which is also coaxial with the feed rate clutch member 50a, and shaft 50.

A transmission for simultaneous translation of table 2 and rotation of work spindle 8 may be alternatively driven from feed clutch member 50a or from quick traverse clutch member 57, through the shaft 58, there being a clutch member 59 slidably splined on the end of shaft 58 and having clutch elements at its opposite ends respectively complementary to the different clutch members and shiftable into engagement with the one or the other clutch members or to a disengaged position by the means of a hand lever 60, connected with the clutch member 59 by a shaft 61, a lever 62, a shifter rod 63 and a pivoted lever 64 having an arm portion engaging an annular groove in the clutch member.

The transmission just mentioned is as follows: Shaft 58 drives a shaft 65, which is rotatably mounted for translation with table 2, through a gear 66 fixed on shaft 58, an idler 67 and a gear 68 internally splined for shaft 65 to slide therethrough. Shaft 65 drives another shaft 69, carried by table 2, through a gear 65a fixed on shaft 65, an idler 70 and a gear 71 fixed on the shaft 69. Shaft 69 drives a differential mechanism generally denoted by numeral 72, Figs. 1 and 4, and which consists of an inner portion 73 fixed on shaft 69, an outer portion 74 fixed with the inner portion, bevel gears 75, 76, journaled on bearing pins to revolve bodily with the inner and outer portions and each engaging the bevel gears 77, 78 which respectively drive the work spindle 8 for rotational movement and the table 2 for longitudinal movement forward or reverse in the direction of the axes of the work spindle.

The work spindle drive from differential mechanism 72 includes the bevel gear 77, which is rotatably mounted on shaft 69, a bevel gear 79 engaged thereby and coaxial shafts 80, 81, Fig. 2, connectible by a motion interrupting clutch 82, a shaft 83 which is driven from shaft 81 through a rate changer 85 consisting of removable and interchangeably replaceable gears 86, 87, a worm 88 fixed on shaft 83, and a worm wheel 89, Figs. 2, 3, fixed on the work spindle 8. The motion interrupting clutch 82 includes a clutch member 91 fixed on the shaft 80 and a clutch member 92 slidably keyed on the shaft 81. The clutch member 92 may be shifted to engage or to disengage the clutch members by the means of a pivoted hand lever 93 having a fork portion engaging an annular groove in the hub of member 92.

The table drive from differential mechanism 72 includes a shaft 94, Figs. 1, 4, upon which bevel gear 78 is fixed, a coaxial shaft 95, connectible to shaft 94 through a reverser and motion interrupter generally denoted by the numeral 96, and a table screw 97 journaled in the table and threadedly engaging a nut 98 fixed in bed 1, the shaft 95 driving screw 97 through the meshed gears 99, 100. The reverser 96 includes the bevel gears 101, 102 interconnected for opposite rotation by a bevel gear 103, the bevel gear 101 being rotatable on shaft 94 and bevel gear 102 being fixed on shaft 95. A clutch member 104 is slidably splined on the extended end of shaft 94 and is provided with clutch teeth on its opposite ends and respectively engageable with complementary clutch teeth on the bevel gears 101, 102, the clutch member having an intermediate disengaged position. Clutch member 104 may be shifted to any of its positions by a hand lever 105, Fig. 1, fixed on a shaft 106 upon which is also fixed a lever 106a having a fork portion engaging an annular groove in the clutch member, there being lost motion between the lever and annular groove for purposes of automatic reversal, later described. A detent mechanism is provided for clutch member 104 which is indicated diagrammatically in Fig. 4, and includes a cam 107 fixed with the lever 106 and a spring pressed cam plunger 108. The cam surfaces and plunger are arranged to quickly operate the clutch member into reverse engagement after a certain degree of movement takes place in either disengaging direction.

Where a machining operation involves a rotatable master cam such as cam 11, the cam is preferably fixed on the same spindle 8 as the work piece, as here shown, or otherwise connected to the differential 72 to be rotated at the same angular velocity as the work piece. A cam follower 109, Fig. 5, which in this instance is a hardened pin but may also be of other well known forms, as for instance a follower roll, is carried from the machine frame by a rigid structure such as the bracket 110, in such manner as to be prevented from bodily movement. The form of cam here shown has been chosen to illustrate the cutting of cams having cam portions mutually at right angles as may be seen in Fig. 6, and having abrupt changes in direction, and also requiring a reversal of direction of table travel in order to complete the cam. It will be understood that the follower 109 may be, and usually is, tapered to permit take up for wear.

Figure 6:
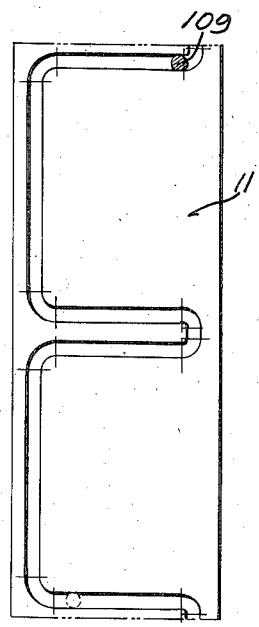
Fig. 6 is the developed surface of the particular master cam shown in Fig. 1.

It will be seen that, in order for the cam follower to follow the groove of the master cam, Fig. 6, the movement will, at times be all rotation without axial movement, at other times from right to left without rotational movement, at other times from left to right, and at still other times partaking both of axial movement in the one or the other direction, and of rotation. To provide for cutting such a cam it is preferable that automatic reversal of table movement should be available.

Figure 7:
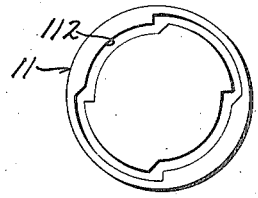
Fig. 7 is an end view of the table reverser control groove sometimes required, as when cutting the work pieces shown in Fig. 1.

Automatic reversal of table movement is provided in this instance by the following mechanism. An arm 111 fixed with lever 106a is extended to engage a groove 112, Figs. 1, 7, in the end face of the master cam 11. Groove 112 is of such form and position with respect to the work guiding groove of the master cam 9 that at some time after the necessary table movement has been completed in one direction, and while the cam movement is pure rotation, or nearly so, the groove 112 disengages reverser 96, but by reason of the lost motion between the lever 106 and the clutch member 104 the disengagement does not take place until the detent plunger 108 has passed the point of cam 107. The reverse engagement therefore takes place immediately. The master cam shown requires four reversals which may be about equally spaced angularly and the groove 112 in this instance is approximately of the form shown in Fig. 7.

The table and work spindle may each be manually adjusted independently, respectively by applying a suitable crank, not shown, to the squared ends 113 of screw 97 and 114 of shaft 83 provided the clutch 92 is disengaged. If the clutch 92 is engaged and clutch 59 is disengaged, the table and work spindle may be manually simultaneously adjusted through the differential by applying the crank to the squared end 115 of shaft 69.

In many instances a thread or groove of constant angle is desired on the work piece, representing a predetermined constant advance of the work spindle 8 axially in the one or the other direction, for a given angular rotation of the spindle. It is obvious that such forms may be cut, by the means disclosed, and irrespective of the ratio of movements in the different paths, but if the ratio is constant it will not be necessary to use a master cam and follower such as cam 11 and follower 109. Instead the work spindle and table screw may be geared together by gearing of suitable ratio to give the constant ratio of movement desired. Gearing for this purpose is diagrammatically indicated in Fig. 1. In the form shown it consists of the gears 116, 117, 118, 119, the end gears being respectively on spindle 8 and on the shaft 95 leading to the screw. Such gears are preferably mounted to be interchangeably positioned and interchangeably replaceable with other gears to provide any desired ratios in either direction. It will be understood that the master cam and follower cannot be used at the same time as gearing is used such as just described. It is intended only to use only the one or the other type of means for determining the relative ratio of spindle rotation and advance.

While the present machine illustrates control of two movements obtained respectively through a longitudinally movable table and a rotatable work spindle, it will be understood that the invention, in many of its important aspects, may also be applied to movement of other supports, such for instance as would provide for the cutting of plate cams or face cams by longitudinal and cross movements, or by either of these movements combined with vertical movement.

When cutting cams, it is desirable that the linear travel of the cutter relative to the work surface shall be at substantially the same rate, whether the movement is all in the one path or all in the other path. If this is done then the feed will be substantially constant in any combination of relative rates. It is necessary when the one direction is rotational, in order to arrive at this result, to change the ratio of the trains leading respectively to the table and to the work spindle to suit the diameter of the work piece. It is for this reason that the rate changer diagrammatically indicated by the removable, replaceable gears 86, 87, is provided. This rate changer may obviously be in either the work spindle train or in the table train. If the machine is to be used solely for cutting plate or flat cams this rate changer would not be necessary, it then being only necessary to make the two trains of equal ratio.

What is claimed is:

1. In a machine tool the combination of a tool support and a work support relatively movable to effect a plurality of cutting directions, transmission mechanism for said relative movement including first and second trains respectively for movement in the different directions and driving means for said trains and operative for simultaneously driving either of said trains at high or low rate relative to the rate of the other train, and control mechanism for said transmission mechanism including a plurality of co-operative elements simultaneously urged for movement in accordance with each of said trains and determinative of the relative rate of each of said trains.

2. In a milling machine the combination of a rotatable cutter spindle, a work support, said spindle and support being relatively movable to effect a plurality of cutting directions each transverse to the axis of said spindle, a transmission connected for rotation of said cutter spindle, transmission mechanism for said relative movement including first and second trains respectively for movement in the different directions and driving means for said trains and operative for simultaneously driving either of said trains at high or low rate relative to the rate of the other train, and control means for said transmission mechanism including a plurality of elements simultaneously urged for movement in accordance with each of said trains and determinative of the relative rates of each of said trains.

3. In a machine tool the combination of a tool support and a work support relatively movable to effect a plurality of cutting directions, transmission mechanism for said relative movement including first and second trains respectively for movement in the different directions and a differential mechanism connected for driving both said trains, and control mechanism for said transmission mechanism including a plurality of elements each urged in accordance with each of said trains and determinative of the relative rate of each of said trains.

4. In a milling machine the combination of a rotatable cutter spindle, a work support, said spindle and support being relatively movable to effect a plurality of mutually transverse cutting directions, a transmission connected for rotation of said cutter spindle, transmission mechanism for said relative movement including first and second trains respectively for movement in the different directions and a differential mechanism connected for driving both said trains, and control means for said transmission mechanism including a plurality of elements each urged in accordance with each of said trains and determinative of the relative rates of each of said trains.

5. In a milling machine the combination of a rotatable cutter spindle, a work support, said spindle and support being relatively movable to effect a plurality of mutually transverse cutting directions, a transmission connected for rotation of said cutter spindle, transmission mechanism for said relative movement including first and second trains respectively for movement in different of said directions and a differential mechanism connected for driving both said trains, and control means for said transmission mechanism including an engaged cam and cam follower, said cam being movable in accordance with the movement in each of said directions and determinative of the relative rates of each of said trains.

6. In a milling machine the combination of a rotatable tool spindle, a reciprocatory work support, a rotatable work spindle carried by said work support, a transmission for tool spindle rotation, a train connected with said work spindle, a train connected for movement of said support, drive means for said trains and operative for simultaneously driving either of said trains at high or low rate relative to the rate of the other train, and control means for said trains including a plurality of elements simultaneously urged in accordance with each of said trains and determinative of the relative rate of each of said trains.

7. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control mechanism simultaneously determinative of the relative rates of said work spindle and support including a cam and cam follower, said cam being movable in accordance with the movements of both said work spindle and said support.

8. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control means including a plurality of elements each urged in accordance with each of said trains and determinative of the relative rates in each of said trains and a rate changer serially connected with said differential in one of said trains.

9. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control means including a cam simultaneously determinative of the rates of said spindle and support and a rate changer serially connected with said differential in one of said trains.

10. In a milling machine the combination of a rotatable tool spindle, a reciprocatory work support, a rotatable work spindle carried by said work support, a transmission for tool spindle rotation, a first train connected with said work spindle, a second train connected for movement of said support, a driving transmission including a differential device simultaneously connected with said trains, and control means simultaneously determinative of the relative rates of said work spindle and support including a third train interconnecting said work spindle and support trains.

11. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control means simultaneously determinative of the relative rates of said work spindle and support including mechanism connecting said spindle and support trains and providing rate change gearing for altering said relative rates.

12. In a machine tool the combination of a tool support and a work support relatively movable to effect a plurality of cutting directions, a transmission mechanism including first and second trains respectively for the different directions and driving means for said trains and operative for simultaneously driving either of said trains at high or low rate relative to the rate of the other train, and control mechanism for said transmission mechanism including means simultaneously determinative of the relative rate of actuation of each of said trains and a shiftable reverser in serial relation in one of said trains.

13. In a milling machine the combination of a rotatable cutter spindle, a work support, said spindle and support being relatively movable to effect a plurality of mutually transverse cutting directions, a transmission connected for rotation of said cutter spindle, transmission mechanism for said relative movement including first and second trains respectively connected for movement in different of said directions and driving means for said trains and operative for simultaneously driving either of said trains at a high or low rate relative to the rate of the other train, and control mechanism for said transmission mechanism including means simultaneously determinative of the relative rate of actuation of both said trains and a shiftable reverser serially connected in one of said trains.

14. In a machine tool the combination of a tool support and a work support relatively movable to effect a plurality of cutting directions, transmission mechanism including first and second trains respectively for the different directions and a differential mechanism simultaneously connected for driving said trains, and control mechanism for said transmission mechanism including means simultaneously determinative of the relative rate of actuation of each of said trains and a shiftable reverser in serial relation in one of said trains.

15. In a milling machine the combination of a rotatable cutter spindle, a work support, said spindle and support being relatively movable to effect a plurality of mutually transverse cutting directions, a transmission connected for rotation of said cutter spindle, transmission mechanism for said relative movement including first and second trains respectively connected for movement in different of said directions and a differential mechanism simultaneously connected for driving said trains, and control mechanism for said transmission mechanism including means simultaneously determinative of the relative rate of actuation of both said trains and a shiftable reverser serially connected in one of said trains.

16. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control mechanism for said trains including means simultaneously determinative of the relative rates of actuation of said trains and a shiftable reverser serially connected in the train for said support.

17. In a milling machine the combination of a rotatable tool spindle, a reciprocatory work support, a rotatable work spindle carried by said work support, a transmission for tool spindle rotation, a train connected with said work spindle, a train connected for movement of said support, a driving transmission including a differential device simultaneously connected with said trains, and control mechanism for said trains including means simultaneously determining the relative rate of said trains, a shiftable reverser serially connected in the train for said support, and means for shifting said reverser at a predetermined point in the rotation of said work spindle.

18. In a milling machine the combination of a rotatable tool spindle and a work support relatively movable to effect a plurality of mutually transverse cutting directions, a transmission for rotation of said spindle, a feed transmission including a feed rate changer, a quick traverse transmission, a differential means, a first and second train respectively connected for said relative movement in different of said directions, and control means including means for alternatively connecting said feed or quick traverse transmission to simultaneously drive both said trains through said differential means, and means simultaneously determinative of the relative rate of actuation of said trains.

19. In a machine tool, the combination with a cutting tool and a work support adapted for movement relative to said cutting tool in two angularly disposed directions, of independent transmission means for effecting movement of said work support in each of said two directions, driving means exerting torque for driving said work support and including torque dividing apparatus connected to divide the work support driving torque between said two transmission means, and movement controlling means associated with said work support and disposed to constrain movement thereof under the influence of the divided driving torque in manner to cause said work support to follow a predetermined path relative to said cutting tool.

20. A machine tool comprising a frame, a cutting tool carried by said frame, a work supporting structure mounted on said frame in manner to be movable in two angularly related directions relative to said cutting tool, independent force transmitting means disposed to move said work support in said two directions respectively, driving means for said work support, force dividing means connecting said driving means to said independent force transmitting means in manner to divide the force exerted by said driving means between said independent force transmitting means respectively to exert forces therethrough tending to move said work support in each of said angularly related directions, and means restraining said work support to movement under the influence of said divided driving force along a predetermined path relative to said cutting tool.

21. In a machine tool having a frame, the combination with a work support and a cutting tool carried by said frame for relative movement along two angularly disposed lines of action, of two independent motion transmitting mechanisms connected to effect relative movement along said two angularly disposed lines of action respectively, driving means for effecting said relative movement at a substantially constant predetermined rate, a force dividing mechanism operatively connecting said driving means to said two motion transmitting mechanisms in manner to divide the driving force of said driving means between said two motion transmitting mechanisms, and motion restricting means disposed to confine the relative movement of said work support and said cutting tool under the influence of said two motion transmitting mechanisms to movement along a predetermined path, whereby a work piece carried by said work support may be machined by said cutting tool to a predetermined configuration.

22. A machine tool comprising a frame, a cutting tool carried by said frame, a work support mounted on said frame for reciprocating movement relative to said cutting tool, a work holding spindle rotatably mounted on said work support for supporting work in manner to provide for reciprocating and rotating movement thereof relative to said cutting tool, a power transmitting train connected to rotate said work spindle, an independent power transmitting train connected to reciprocate said work support, a power source for actuating said trains, a differential mechanism connecting said power source to said trains in manner to divide the torque exerted by said power source between said two trains to urge them respectively to effect reciprocating and rotating movement of said work holding spindle, and means constraining the reciprocating and rotating movement of said spindle to a combined movement along a predetermined path relative to said cutting tool, whereby a work piece carried by said spindle may be shaped in accordance with said predetermined path of movement.

23. A machine tool, comprising a frame, a work support mounted on said frame for reciprocating movement, a work holding spindle rotatably carried by said work support, a work forming tool carried by said frame in cooperating relation with said work holding spindle, driving means to reciprocate said work support, driving means to rotate said work spindle, power transmitting means disposed to exert work-moving force for actuating said support and said spindle including a differential mechanism disposed to divide the work-moving force between said driving means for reciprocating said support and for rotating said spindle, and work guiding means including a cam and a cam follower arranged to restrict the combined movement of said work under the influence of said divided work-moving force to cause it to follow a predetermined path relative to said work forming tool.

24. In a machine tool having a frame, the combination with a work support and a cutting tool disposed on said frame for relative movement along two angularly disposed lines of cutting action, of two independent motion transmitting gear trains disposed respectively to effect said relative movement along said two angularly disposed lines of cutting action, driving means disposed to exert torque to effect said cutting action at a substantially constant predetermined rate, a differential mechanism operatively connecting said driving means to said two independent motion transmitting gear trains in manner to divide the torque exerted by said driving means between said two gear trains, and motion restricting means disposed to confine the relative movement of said work support and said cutting tool under the influence of the divided driving torque exerted by said differential mechanism through said independent gear trains to movement along a predetermined path, whereby a work piece carried by said work support may be machined to a predetermined irregular configuration.

25. In a machine tool having a frame, the combination with a work support and a cutting tool disposed on said frame for relative movement along two angularly disposed lines of cutting action, of two independent motion transmitting gear trains disposed respectively to effect said relative movement along said two angularly disposed lines of cutting action, driving means disposed to exert torque to effect said cutting action at a substantially constant predetermined rate, a differential mechanism operatively connecting said driving means to said two independent motion transmitting gear trains in manner to divide the torque exerted by said driving means between said two gear trains, a rate changing mechanism in one of said gear trains for adjusting the proportion in which said driving torque is divided to effect relative movement along said two lines of cutting action, and motion restricting means disposed to confine the relative movement of said work support and said cutting tool under the influence of the divided driving torque exerted by said differential mechanism through said independent gear trains to movement along a predetermined path, whereby a work piece carried by said work support may be machined to a predetermined irregular configuration.

26. A milling machine having a cutter, a reciprocatory work supporting table disposed in cooperating relation with said cutter, a work holding spindle rotatably mounted on said table for supporting a work piece in manner to be reciprocated and rotated relative to said cutter, separate driving trains for reciprocating said table and for rotating said work spindle, a three-element differential mechanism having two elements thereof connected respectively to drive said separate driving trains, a power source connected to the third element of said differential mechanism in manner to exert driving torque through said differential mechanism upon said separate driving trains independently, and means constraining reciprocating and rotating movement of said spindle under the influence of said separate driving torques to movement along a predetermined path, whereby a work piece supported by said spindle may be fed to said cutter with combined rotary and reciprocatory motion in manner to be formed in accordance with the path defined by said constraining means.

27. A milling machine having a cutter, a reciprocatory work supporting table disposed in cooperating relation with said cutter, a work holding spindle rotatably mounted on said table for supporting a work piece in manner to be reciprocated and rotated relative to said cutter, separate driving trains for reciprocating said table and for rotating said work spindle, a three-element differential mechanism having two elements thereof connected respectively to drive said separate driving trains, a power source connected to the third element of said differential mechanism in manner to exert driving torque through said differential mechanism upon said separate driving trains independently, and gearing disposed to connect said spindle directly to said table driving train to constrain said spindle to rotation at a predetermined rate relative to the reciprocating movement of said table.

28. A milling machine having a cutter, a reciprocatory work supporting table disposed in cooperating relation with said cutter, a work holding spindle rotatably mounted on said table for supporting a work piece in manner to be reciprocated and rotated relative to said cutter, separate driving trains for reciprocating said table and for rotating said work spindle, a three-element differential mechanism having two elements thereof connected respectively to drive said separate driving trains, a power source connected to the third element of said differential mechanism in manner to exert driving torque through said differential mechanism upon said separate driving trains independently, and a cam and follower mechanism disposed to restrict movement of said spindle under the influence of said separate driving torques to rotary or rectilinear movement or combined rotary and rectilinear movement along a predetermined path, whereby a work piece supported by said spindle may be machined by said cutter to a configuration determined by said cam and follower mechanism.

29. A milling machine having a cutter, a reciprocatory work supporting table disposed in cooperating relation with said cutter, a work holding spindle rotatably mounted on said table for supporting a work piece in manner to be reciprocated and rotated relative to said cutter, separate driving trains for reciprocating said table and for rotating said work spindle, a three-element differential mechanism having two elements thereof connected respectively to drive said separate driving trains, a power source connected to the third element of said differential mechanism in manner to exert driving torque through said differential mechanism upon said separate driving trains independently, a cam mounted on said work spindle, and a follower stationarily mounted relative to said cutter and cooperating with said cam in manner to restrict movement of said spindle under the influence of said separate driving torques to the path defined by said cam.

JOSEPH B. ARMITAGE.